(12) United States Patent
Song

(10) Patent No.: US 10,897,791 B2
(45) Date of Patent: Jan. 19, 2021

(54) METHODS AND DEVICES FOR CONFIGURING AND ACQUIRING EMERGENCY NUMBER

(71) Applicants: China Mobile Communication LTD., Research Institute, Beijing (CN); China Mobile Communications Corporation, Beijing (CN)

(72) Inventor: Yue Song, Beijing (CN)

(73) Assignees: China Mobile Communication Ltd., Research Institute, Beijing (CN); China Mobile Communications Corporation, Beijing (CN)

(*) Notice: Subject to any disclaimer, the term of this patent is extended or adjusted under 35 U.S.C. 154(b) by 0 days.

(21) Appl. No.: 16/466,876

(22) PCT Filed: Dec. 8, 2017

(86) PCT No.: PCT/CN2017/115163
§ 371 (c)(1),
(2) Date: Jun. 5, 2019

(87) PCT Pub. No.: WO2018/103732
PCT Pub. Date: Jun. 14, 2018

(65) Prior Publication Data
US 2020/0092941 A1     Mar. 19, 2020

(30) Foreign Application Priority Data
Dec. 8, 2016   (CN) .......................... 2016 1 1122633
May 4, 2017    (CN) .......................... 2017 1 0309293

(51) Int. Cl.
*H04W 4/02*     (2018.01)
*H04W 84/12*    (2009.01)
(Continued)

(52) U.S. Cl.
CPC ............ *H04W 76/50* (2018.02); *H04L 65/103* (2013.01); *H04W 4/029* (2018.02); *H04W 4/90* (2018.02); *H04W 12/06* (2013.01)

(58) Field of Classification Search
CPC ....... H04W 4/90; H04W 4/029; H04W 64/00; H04W 76/50; H04W 4/023
See application file for complete search history.

(56) References Cited

U.S. PATENT DOCUMENTS

2011/0032931 A1   2/2011   Zhu et al.
2011/0134897 A1   6/2011   Montemurro et al.
(Continued)

FOREIGN PATENT DOCUMENTS

CN   105282723 A   *   1/2006
CN   101361357 A        2/2009
(Continued)

OTHER PUBLICATIONS

Determine of emergency number for call over WLAN, SA WG2 Meeting #115, May 23-27, 2016, pp. 1-4, SR-162801, Nanjing, P.R. China.
(Continued)

*Primary Examiner* — Gary Lafontant
(74) *Attorney, Agent, or Firm* — Price Heneveld LLP

(57) ABSTRACT

The present disclosure provides a method and a device for configuring an emergency number, and a method and a device for acquiring an emergency number. The method for configuring an emergency number comprises: determining, by a network side device, position information about a UE when the UE has accessed to a wireless local area network; and issuing, by the network side device, an emergency number list corresponding to the position information about the UE to the UE.

18 Claims, 3 Drawing Sheets

```
                                                    S101
┌──────────────────────────────────────────────────────────┐
│ determining, by a network side device, position         │
│ information about a UE when the UE has accessed to a    │
│ wireless local area network                             │
└──────────────────────────────────────────────────────────┘
                            │
                            │                       S102
┌──────────────────────────────────────────────────────────┐
│ issuing, by the network side device, an emergency       │
│ number list corresponding to the position information   │
│ about the UE to the UE                                  │
└──────────────────────────────────────────────────────────┘
```

(51) Int. Cl.
  *H04W 76/50* (2018.01)
  *H04W 4/029* (2018.01)
  *H04W 4/90* (2018.01)
  *H04L 29/06* (2006.01)
  *H04W 12/06* (2009.01)

(56) References Cited

U.S. PATENT DOCUMENTS

| | | | |
|---|---|---|---|
| 2015/0118987 A1 | 4/2015 | Deason et al. | |
| 2016/0037301 A1* | 2/2016 | Davydov | H04W 4/021 455/404.2 |
| 2016/0134710 A1* | 5/2016 | Ryu | H04L 67/16 370/338 |
| 2017/0005914 A1* | 1/2017 | Edge | H04W 48/18 |

FOREIGN PATENT DOCUMENTS

| | | |
|---|---|---|
| CN | 101568091 A | 10/2009 |
| CN | 101577891 A | 11/2009 |
| CN | 102714654 A | 10/2012 |
| CN | 104955011 A | 9/2015 |
| CN | 105282723 A * | 1/2016 |
| CN | 105684408 A | 6/2016 |
| CN | 105848103 A | 8/2016 |
| CN | 105848121 A | 8/2016 |
| CN | 105898042 A | 8/2016 |
| CN | 106507300 A | 3/2017 |
| CN | 107277790 A | 10/2017 |
| EP | 2161912 A3 | 3/2010 |
| JP | 2018137490 A | 8/2018 |
| WO | 2013172680 A1 | 11/2013 |

OTHER PUBLICATIONS

3rd Generation Partnership Project; Technical Specification Group Services and System Aspects; Study on system impacts of IMS emergency sessions over WLAN (Release 13), 3GPP TR 23.771 V1.3.0, Feb. 2016, pp. 1-57.

3rd Generation Partnership Project; Technical Specification Group Services and System Aspects; Architecture enhancements for non-3GPP accesses (Release 14), 3GPP TS 23.402 V14.1.0, Sep. 2016, pp. 1-19.

3rd Generation Partnership Project; Technical Specification Group Services and System Aspects; Study on system impacts of IMS emergency sessions over WLAN (Release 13), 3GPP TR 23.771 V13.0.0, Jun. 2016, pp. 1-65.

* cited by examiner

METHODS AND DEVICES FOR CONFIGURING AND ACQUIRING EMERGENCY NUMBER

CROSS-REFERENCE TO RELATED APPLICATION

The present application is the U.S. national phase of PCT Application No. PCT/CN2017/115163 filed on Dec. 8, 2017, which claims the priority of the Chinese patent application 201611122633.5 filed on Dec. 8, 2016 and the priority of the Chinese patent application 201710309293.5 filed on May 4, 2017, which are incorporated herein by reference in their entirety.

TECHNICAL FIELD

The present disclosure relates to the field of network technology, in particular to a method and a device for configuring an emergency number, and a method and a device for acquiring an emergency number.

BACKGROUND

Along with the rapid development of the Long Term Evolution (LTE) coverage and the widespread application of Wireless Fidelity (WiFi) access, voice services have currently been provided by an operator through such measures as LTE, WiFi and Circuit Switch (CS), rather than merely through CS as previously used. No matter which one of the above measures is adopted for the voice call service, an emergency call service is one of the important services which should be provided by the operator. Hence, a Voice over WiFi (VoWiFi) service also needs to include the emergency call service provided to a user.

Currently, the VoWiFi service is established on the basis of an Internet Protocol (IP) Multimedia Subsystem (IMS), and there are two following modes for the execution of the emergency call service in the IMS, including:

Mode 1: "emergency call capable of being identified by User Equipment (UE)". In this mode, when a called number has been inputted by a user, the UE is capable of identifying the called number as an emergency call immediately, so the UE may execute an emergency call-related process rapidly.

Mode 2: "emergency call incapable of being identified by the UE". In this mode, when the called number has been inputted by the user, the UE is incapable of identifying the called number as an emergency call, and it may initiate a call in a normal calling process. A network side device may transmit a specific response message to the UE to notify the UE that the currently-called number is the emergency call when the network side device has determined the called number as the emergency call. The UE may then execute the emergency call-related process.

Hence, in order to enable the UE to make a response and execute the emergency call-related process rapidly when the emergency call service is initiated on the basis of VoWiFi, it is necessary to enable the UE to identify the emergency call as possible. After the user has inputted the called number, the key for the UE to identify the called number as the emergency call immediately lies in that the UE is capable of inquiring the called number from an emergency number list stored therein to determine the called number as an emergency number.

However, for the VoWiFi service, there are currently two modes adopted by the UE to configure the emergency number list. In a first mode, the emergency number list is pre-configured locally in the UE when the UE leaves the factory, and in a second mode, the emergency number list is pre-stored by the user in a Subscriber Identity Module (SIM). The two configuration schemes of the emergency number are both early-stage fixed configuration modes. In the fixed configuration mode, when the user is roaming and has inputted an emergency number at a roaming destination, the UE may probably be incapable of inquiring the emergency number from the fixedly configured emergency number list. For example, when a Chinese user is roaming in America and has dialed an emergency number "911", the UE is incapable of identifying the called number as an emergency number because the corresponding emergency number stored in the emergency number list is "110". At this time, it is merely able for the UE to execute the current emergency call service in a normal calling process.

In a word, the conventional emergency number configuration scheme provided by the related art may not be adapted to a situation where the UE is roaming.

SUMMARY

An object of the present disclosure is to provide a method and a device for configuring an emergency number, and a method and a device for acquiring an emergency number, so as to enable an emergency number configuration scheme to be adapted to a situation where a UE is roaming.

In one aspect, the present disclosure provides in some embodiments a method for configuring an emergency number, including: determining, by a network side device, position information about a UE when the UE has accessed to a wireless local area network; and issuing, by the network side device, an emergency number list corresponding to the position information about the UE to the UE.

In some possible embodiments of the present disclosure, the method further includes configuring the emergency number list for the UE in accordance with the determined position information about the UE and pre-configured emergency number lists corresponding to different geographical position information. The issuing, by the network side device, the emergency number list corresponding to the position information about the UE to the UE includes issuing, by the network side device, the emergency number list configured for the UE to the UE.

In some possible embodiments of the present disclosure, the determining, by the network side device, the position information about the UE includes receiving, by the network side device, a connection establishment message from the UE; and determining the position information about the UE in accordance with information about the UE carried in the connection establishment message.

In some possible embodiments of the present disclosure, the connection establishment message is a connection request message or an authentication request message.

In some possible embodiments of the present disclosure, the information about the UE includes information about an IP address of the UE or the position information about the UE.

In some possible embodiments of the present disclosure, subsequent to receiving, by the network side device, the connection request message from the UE and prior to issuing, by the network side device, the emergency number list configured for the UE to the UE, the method further includes transmitting, by the network side device, a connection response message to the UE so as to notify the UE that a communication channel has been established successfully.

In some possible embodiments of the present disclosure, the issuing, by the network side device, the emergency number list configured for the UE to the UE includes, upon the receipt of the authentication request message carrying emergency number list request information transmitted by through the communication channel, transmitting, by the network side device, an authentication response message carrying the configured emergency number list to the UE through the communication channel.

In some possible embodiments of the present disclosure, subsequent to receiving, by the network side device, the authentication request message and prior to transmitting, by the network side device, the authentication response message to the UE, the method further includes: transmitting a validation request message to an authentication server so that the authentication server performs identity authentication on the UE; and after the identity authentication has been performed successfully, transmitting a session establishment request message to a Packet Data Network (PDN) Gateway (PGW). The transmitting, by the network side device, the authentication response message to the UE includes, upon the receipt of the session establishment response message from the PGW, transmitting, by the network side device, the authentication response message to the UE through the communication channel.

In some possible embodiments of the present disclosure, the network side device is an evolved Packet Data Gateway (ePDG).

In another aspect, the present disclosure provides in some embodiments a method for acquiring an emergency call, including receiving, by a UE, an emergency number list corresponding to position information about the UE from a network side device after the UE has accessed to a wireless local area network.

In some possible embodiments of the present disclosure, the receiving, by the UE, the emergency number list corresponding to the position information about the UE from the network side device includes: transmitting, by the UE, an authentication request message carrying emergency number list request information to the network side device through a communication channel established between the UE and the network side device; and receiving, by the UE, an authentication response message carrying a configured emergency number list from the network side device through the communication channel.

In some possible embodiments of the present disclosure, the method further includes storing the emergency number list, so as to enable the UE to execute an emergency call service in accordance with the emergency number list.

In yet another aspect, the present disclosure provides in some embodiments a device for configuring an emergency number, including: a determination module configured to determine position information about a UE when the UE has accessed to a wireless local area network; and a transmission module configured to issue an emergency number list corresponding to the position information about the UE to the UE.

In some possible embodiments of the present disclosure, the device further includes a configuration module configured to configure the emergency number list for the UE in accordance with the determined position information about the UE and pre-configured emergency number lists corresponding to different geographical position information. The transmission module is further configured to issue the emergency number list configured for the UE to the UE.

In some possible embodiments of the present disclosure, the device further includes a reception module configured to receive a connection establishment message from the UE. The determination module is further configured to, after the reception module has received the connection establishment message from the UE, determine the position information about the UE in accordance with information about the UE carried in the connection establishment message.

In some possible embodiments of the present disclosure, the reception module is further configured to receive a connection request message or an authentication request message from the UE. The determination module is further configured to, after the reception module has received the connection request message or the authentication request message from the UE, determine the position information about the UE in accordance with the information about the UE carried in the connection request message or the authentication request message.

In some possible embodiments of the present disclosure, the determination module is further configured to, after the reception module has received the connection request message or the authentication request message from the UE, determine the position information about the UE in accordance with information about an IP address of the UE or the position information about the UE carried in the connection request message or the authentication request message.

In some possible embodiments of the present disclosure, the transmission module is further configured to, after the reception module has received the connection request message from the UE and before the transmission module has issued the emergency number list configured for the UE to the UE, transmit a connection response message to the UE so as to notify the UE that a communication channel has been established successfully.

In some possible embodiments of the present disclosure, the reception module is further configured to receive the authentication request message carrying emergency number list request information from the UE through the communication channel. The transmission module is further configured to transmit an authentication response message carrying the configured emergency number list to the UE through the communication channel.

In some possible embodiments of the present disclosure, the transmission module is further configured to: after the reception module has received the authentication request message and before the transmission module has transmitted the authentication response message to the UE, transmit a validation request message to an authentication server so that the authentication server performs identity authentication on the UE; after the identity authentication has been performed successfully, transmit a session establishment request message to a PGW; and after the reception module has received a session establishment response message from the PGW, transmit the authentication response message to the UE through the communication channel.

In still yet another aspect, the present disclosure provides in some embodiments a device for acquiring an emergency number, including: an access module configured to enable a UE to access to a wireless local area network; and a reception module configured to receive an emergency number list corresponding to position information about the UE from a network side device after the UE has accessed to a wireless local area network.

In some possible embodiments of the present disclosure, the device further includes a transmission module configured to transmit an authentication request message carrying emergency number list request information to the network side device through a communication channel established between the UE and the network side device. The reception module is further configured to receive an authentication response message carrying a configured emergency number list from the network side device through the communication channel.

In some possible embodiments of the present disclosure, the device further includes a storage module configured to store the emergency number list, so as to enable the UE to execute an emergency call service in accordance with the emergency number list.

In still yet another aspect, the present disclosure provides in some embodiments a device for configuring an emergency number, including a processor, a memory, and a computer program stored in the memory and executed by the processor. The computer program is executed by the processor so as to implement the above-mentioned method for configuring the emergency number.

In still yet another aspect, the present disclosure provides in some embodiments a device for acquiring an emergency number, including a processor, a memory, and a computer program stored in the memory and executed by the processor. The computer program is executed by the processor so as to implement the above-mentioned method for acquire the emergency number.

In still yet another aspect, the present disclosure provides in some embodiments a computer-readable storage medium storing therein a computer program. The computer program is executed by a processor so as to implement the above-mentioned method for configuring the emergency number.

In still yet another aspect, the present disclosure provides in some embodiments a computer-readable storage medium storing therein a computer program. The computer program is executed by a processor so as to implement the above-mentioned method for acquiring the emergency number.

According to the embodiments of the present disclosure, the emergency number lists corresponding to different geographical positions may be pre-configured in the network side device. After the UE has accessed to the wireless local area network, the network side device may determine the position information about the UE, and issue the emergency number list corresponding to the position information to the UE. As a result, even when the UE is roaming, the UE may acquire the emergency number list at a roaming destination after it has accessed to the wireless local area network at the roaming destination, so it is able for the UE to dynamically acquire the emergency number list. When an emergency call service is executed by a user through VoWiFi, the UE may identify a called number inputted by the user as the emergency number at the roaming destination in accordance with the acquired emergency number list at the roaming destination, so it is able for the UE to execute an emergency calling process rapidly.

DETAILED DESCRIPTION OF THE EMBODIMENTS

According to the embodiments of the present disclosure, emergency number lists corresponding to different geographical positions may be pre-configured in a network side device. After a UE has accessed to a wireless local area network, the network side device may determine position information about the UE, and issue the emergency number list corresponding to the position information to the UE. As a result, even when the UE is roaming, the UE may acquire the emergency number list at a roaming destination after it has accessed to the wireless local area network at the roaming destination, so it is able for the UE to dynamically acquire the emergency number list. When an emergency call service is executed by a user through VoWiFi, the UE may identify a called number inputted by the user as the emergency number at the roaming destination in accordance with the acquired emergency number list at the roaming destination, so it is able for the UE to execute an emergency calling process rapidly.

The present disclosure will be described hereinafter in conjunction with the drawings and the embodiments. In the embodiments of the present disclosure, the determining, by the network side device, the position information about the UE may include receiving a connection establishment message from the UE, and determining the position information about the UE in accordance with information about the UE carried in the connection establishment message. The connection establishment message may include a connection request message or an authentication request message, and the information about the UE may include information about an IP address of the UE or the position information about the UE.

First Embodiment

Figure 1:
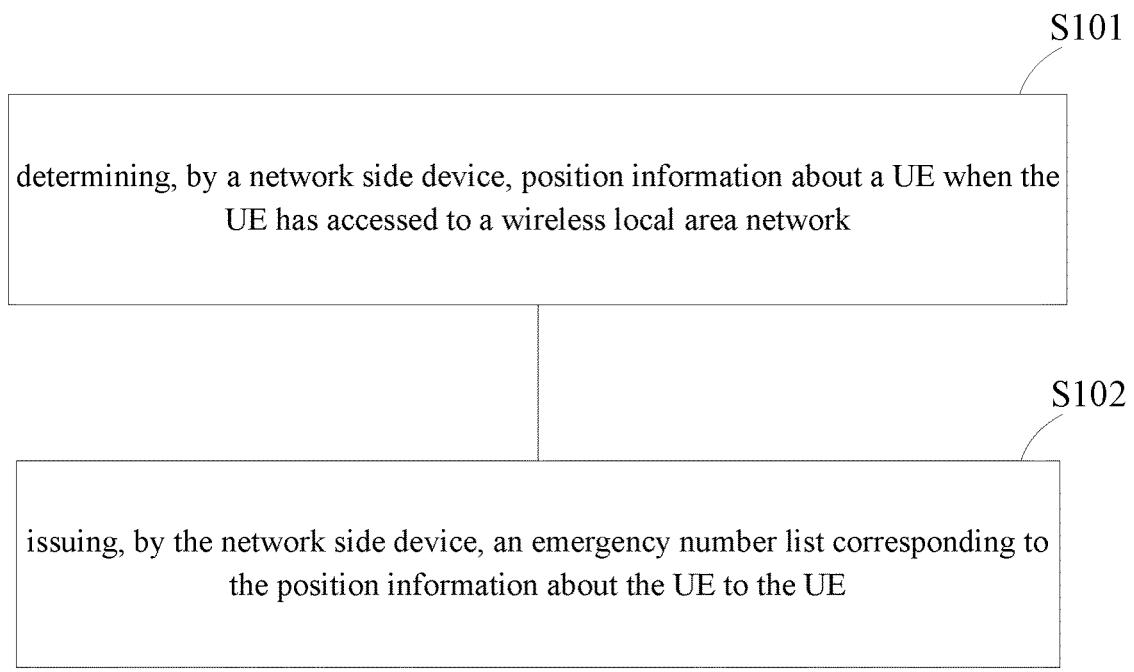
FIG. 1 is a flow chart of a method for configuring an emergency number according to a first embodiment of the present disclosure.

As shown in FIG. 1, the present disclosure provides in this embodiment a method for configuring an emergency number which includes the following steps.

S101: determining, by a network side device, position information about a UE when the UE has accessed to a wireless local area network.

The method for configuring the emergency number may be applied to the network side device, and the network side device may be a gateway device. Of course, the network side device may also be a router device or a switch device. Based on a core conception of the present disclosure, the gateway is capable of taking the advantages of the present disclosure, but the network side device is not limited to the gateway. For example, when an emergency calling service is initiated by the UE on the basis of VoWiFi after the UE has accessed to the wireless local area network, the gateway device may be an evolved Packet Data Gateway (ePDG).

The network side device may determine the position information about the UE, and the position information may refer to a certain country or a certain region of the country. However, the emergency calls for different regions of a same country, e.g., Chinese mainland and Hong Kong, may be different. In some possible embodiments of the present disclosure, when determining the position information about the UE, the network side device may determine a specific region of a country where the UE is currently located.

S102: issuing, by the network side device, an emergency number list corresponding to the position information about the UE to the UE.

After determining the position information about the UE, the network side device may issue the emergency number list corresponding to the position information about the UE to the UE. To be specific, the emergency number list corresponding to the position information may be stored locally in the network side device, or stored in any other network side device.

When the emergency number list corresponding to the position information is locally stored in the network side device, the network side device may directly issue the emergency number list corresponding to the position information to the UE. When the emergency number list corresponding to the position information is stored in the other network side device, the network side device may transmit a request for acquiring the emergency number list corresponding to the position information to the other network side device. Upon the receipt of the request, the other network side device may transmit the emergency number list corresponding to the position information to the network side device, and then the network side device may issue the received emergency number list corresponding to the position information about the UE to the UE.

According to this embodiment of the present disclosure, after the UE has accessed to the wireless local area network, the network side device may determine the position information about the UE, and transmit the emergency number list corresponding to the position information about the UE to the UE. Even when the UE is roaming, it may still acquire the emergency number list at a roaming destination after it has accessed to the wireless local area network at the roaming destination. As a result, it is able to dynamically acquire the emergency number list.

Second Embodiment

Figure 2:
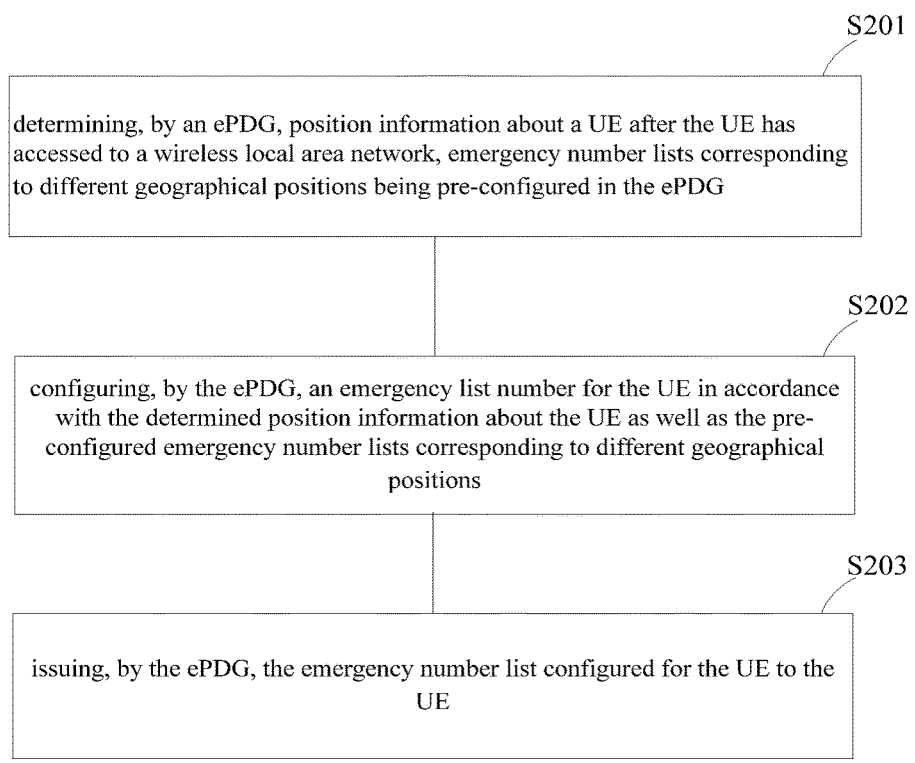
FIG. 2 is another flow chart of the method for configuring the emergency number according to a second embodiment of the present disclosure.

In order to acquire the emergency number list efficiently, on the basis of the first embodiment, the present disclosure further provides in this embodiment a method for configuring an emergency number which, as shown in FIG. 2, includes the following steps.

S201: determining, by an ePDG, position information about a UE after the UE has accessed to a wireless local area network. Emergency number lists corresponding to different geographical positions have been pre-configured in the ePDG.

During the implementation, after the UE has accessed to the wireless local area network, it may transmit a connection request message to the ePDG, and the connection request message may carry information about an IP address of the UE. Here, the information about the IP address of the UE may be allocated automatically by a network side device when the UE has accessed to the wireless local area network.

Further, upon the receipt of the connection request message carrying the information about the IP address from the UE, the ePDG may determine the current position information about the UE in accordance with the information about the IP address of the UE. In addition, upon the receipt of the connection request message from the UE, the ePDG may further transmit a connection response message to the UE, so as to notify the UE that a communication channel has been established successfully. Subsequently, an authentication process may be completed between the UE and the ePDG through the established communication channel.

S202: configuring, by the ePDG, an emergency list number for the UE in accordance with the determined position information about the UE as well as the pre-configured emergency number lists corresponding to different geographical positions.

During the implementation, after determining the current position information about the UE, the ePDG may inquire the pre-configured emergency number lists corresponding to different geographical positions, and configure the emergency number list corresponding to the current position information about the UE for the UE.

S203: issuing, by the ePDG, the emergency number list configured for the UE to the UE.

During the implementation, upon the receipt of a message for requesting the emergency number list from the UE, the ePDG may issue the emergency number list to the UE through the established communication channel.

To be specific, the message for requesting the emergency number list may be carried in an authentication request message transmitted by the UE to the ePDG. Upon the receipt of the authentication request message carrying the message for requesting the emergency number list from the UE, the ePDG may transmit an authentication response message to the UE. The authentication response message may carry therein the emergency number list corresponding to the current position information about the UE.

Here, identity information about the UE (e.g., International Mobile Subscriber Identity (IMSI)) may also be carried in the authentication request message received by the ePDG.

During the implementation, after receiving the authentication request message and before transmitting the authentication response message to the UE, the ePDG may further transmit a validation request message to an authentication server, so that the authentication server may perform identity authentication on the UE. The authentication server may be an Authentication Authorization Accounting (AAA) server. Here, an identity authentication process performed by the AAA server is a standard process known in the art, and thus will not be particularly defined herein.

Upon the receipt of a validation response message from the authentication server, when information indicating that the identity authentication has been performed successfully is carried in the authentication response message, the ePDG may further transmit a session establishment request message to a PGW, so as to establish a connection relationship between the UE and a Packet Data Network (PGN). Here, a process of requesting, by the ePDG, the PGW to establish a session for the UE is a standard process known in the art, and thus will not be particularly defined herein.

Upon the receipt of the session establishment response message from the PGW, the ePDG may transmit the authentication response message to the UE through the communication channel established between the ePDG and the UE, and the emergency number list corresponding to the determined position information may be carried in the authentication response message.

Here, apart from the ePGD, the method in this embodiment may also be executed by any network side device in a core network capable of achieving the above-mentioned functions.

According to this embodiment of the present disclosure, the emergency number lists corresponding to different geographical positions may be pre-configured in the network side device. After the UE has accessed to the wireless local area network, the network side device may determine the position information about the UE, and issue the emergency number list corresponding to the position information to the UE. In this way, even when the UE is roaming, the UE may still acquire the emergency number list at a roaming destination after it has accessed to the wireless local area network at the roaming destination, so it is able to dynamically acquire the emergency number list. In addition, when an emergency calling service is executed by the UE through VoWiFi, the UE may identify a called number inputted by the user as an emergency number at the roaming destination in accordance with the acquired emergency number list at the roaming destination, so it is able to execute the emergency calling process rapidly.

Third Embodiment

On the above embodiments, in this embodiment of the present disclosure, the UE may transmit a connection request message to the ePDG after the UE has accessed to the wireless local area network, and the position information about the UE may also be carried in the connection request message. Upon the receipt of the connection request message carrying the position information about the UE from the UE, the ePDG may determine the position information as the current position information about the UE. In addition, upon the receipt of the connection request message from the UE, the ePDG may further transmit a connection response message to the UE, so as to notify the UE that a communication channel has been established successfully. Subsequently, an authentication process may be completed between the UE and the ePDG through the established communication channel.

In addition, the authentication request message transmitted by the UE to the ePDG may further carry therein information about the UE. The ePDG may determine the position information about the UE in accordance with the information about the UE carried in the authentication request message.

To be specific, upon the receipt of the authentication request message carrying the information about the IP address from the UE, the ePDG may determine the current position information about the UE in accordance with the information about the IP address of the UE. In addition, the ePDG may transmit an authentication response message to the UE in accordance with information for requesting the emergency number list carried in the authentication request message, and the emergency number list corresponding to the current position information about the UE may be carried in the authentication response message.

Alternatively, the position information about the UE may be carried in the authentication request message. Upon the receipt of the authentication request message carrying the position information about the UE from the UE, the ePDG may determine the position information as the current position information about the UE, and transmit the authentication response message to the UE in accordance with the information for requesting the emergency number list carried in the authentication request message. The emergency number list corresponding to the current position information about the UE may be carried in the authentication response message.

The position information about the UE carried in the connection request message and the authentication request message may be position information determined by the UE itself. The UE may determine the current position information by itself in accordance with a cellular network corresponding to the wireless local area network to which the UE has currently accessed, or the information about the IP address of the UE, or through a Global Positioning System (GPS) configured in the UE.

A process of determining, by the UE, the position information in accordance with the cellular network corresponding to the wireless local area network to which the UE has currently accessed, a process of determining the position information in accordance with the information about the IP address of the UE, and a process of determining the position information in accordance with the GPS are known in the art, and thus will not be particularly defined herein.

Here, apart from the ePDG, the method in the third embodiment of the present disclosure may also be executed by any other network side device in a core network capable of achieving the above-mentioned functions.

According to the third embodiment of the present disclosure, the network side device may determine the position information about the UE in accordance with the information about the UE carried in the connection establishment message from the UE, and issue the emergency number list corresponding to the position information to the UE. In addition, the information about the UE may be the position information about the UE, and at this time, the network side device may directly take the position information about the current position information about the UE. As a result, it is able for the network side device to determine the position information about the UE efficiently, and reduce the number of computational resources, thereby to enable the UE to execute an emergency calling process rapidly.

Fourth Embodiment

Figure 3:
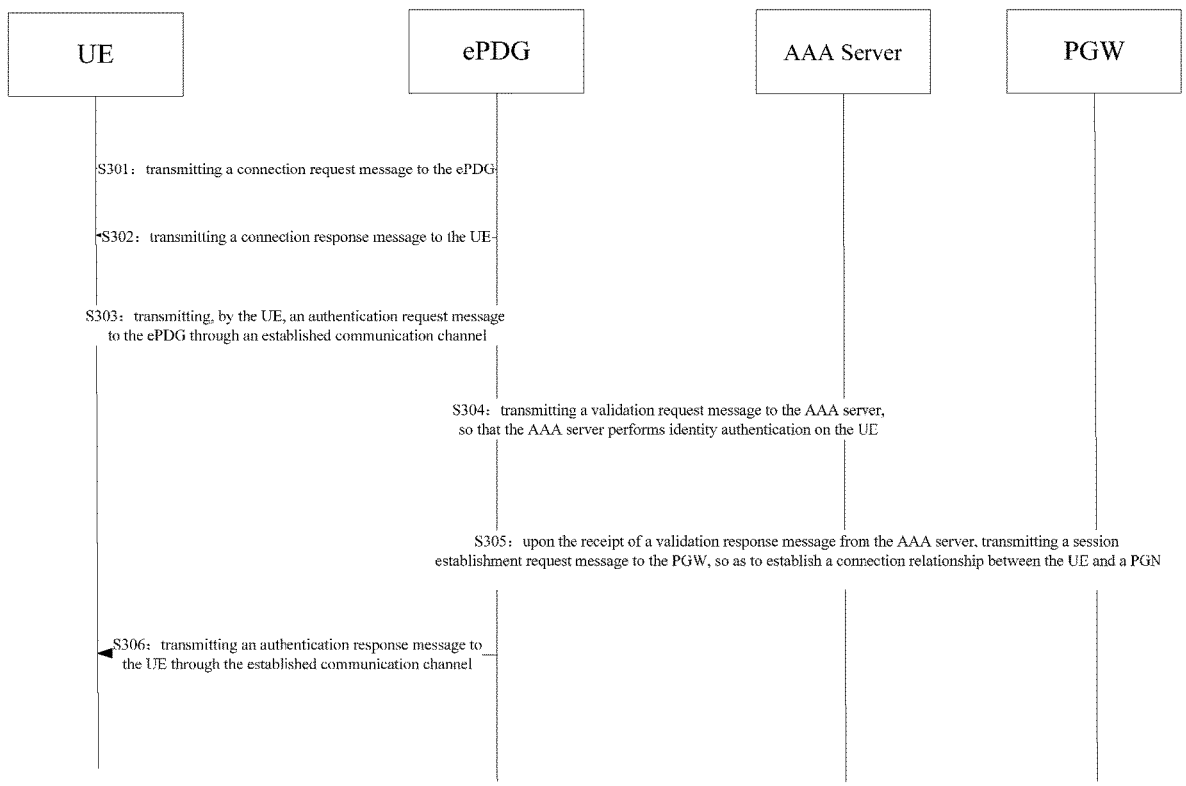
FIG. 3 is yet another flow chart of the method for configuring the emergency number according to a fourth embodiment of the present disclosure.

As shown in FIG. 3, the present disclosure further provides in this embodiment a method for configuring an emergency number. FIG. 3 shows a process of configuring, by a network side device, an emergency number list for a UE at a roaming destination when the UE is roaming. The method includes the following steps.

S301: initiating, by the UE, negotiation of Internet Key Exchange Security Alliance (IKA SA) with an ePDG after the UE has accessed to a wireless local area network at the roaming destination, i.e., transmitting, by the UE, a connection request (IKE_INIT_Request) message to the ePDG. Information about a local IP address of the UE may be carried in the IKE_INIT_Request message.

Here, emergency number lists corresponding to different geographical positions may be pre-configured in the ePDG. Apart from the information about the local IP address of the UE, negotiation information (e.g., an SA proposal) may also be carried in the IKE_INIT_Request.

S302: upon the receipt of the IKE_INIT_Request message, determining, by the ePDG, current position information about the UE in accordance with the information about the local IP address carried in the IKE_INIT_Request message, determining an IKA SA-related encryption algorithm in accordance with the negotiation information carried in the IKE_INIT_Request message, and transmitting a connection response (IKE_INIT_Response) message to the UE.

Here, the IKE_INIT_Response message may be adopted to notify the UE that a communication channel has been established successfully, and this communication channel may be an Internet Key Exchange v2 (IKEv2) channel.

S303: transmitting, by the UE, an authentication request (IKE_AUTH_Request) message to the ePDG through the established communication channel. Information for requesting the emergency number list may be carried in the IKE_AUTH_Request message.

Here, identity information about the UE may be further carried in the IKE_AUTH_Request message.

S304: upon the receipt of the IKE_AUTH_Request message, transmitting, by the ePDG, a validation request message to an AAA server, so that the AAA server performs identity authentication on the UE.

Here, a process of performing, by the AAA server, the identity authentication on the UE is a standard process known in the art, and thus will not be particularly defined herein.

S305: after the identity authentication has been performed successfully, i.e., upon the receipt of a validation response message from the AAA server, transmitting, by the ePDG, a session establishment request message to a PGW, so as to establish a connection relationship between the UE and a PGN.

Here, a process of requesting, by the ePDG, the PGW to establish a session for the UE is a standard process known in the art, and thus will not be particularly defined herein.

S306: upon the receipt of the session establishment response message from the PGW, transmitting, by the ePDG, an authentication response (IKE_AUTH_Response) message to the UE through the established communication channel. The emergency number list corresponding to the position information about the UE may be carried in the IKE_AUTH_Response message.

According to the fourth embodiment of the present disclosure, the emergency number lists corresponding to different geographical positions may be pre-configured in the ePDG. After the UE has accessed to the wireless local area network at the roaming destination, the ePDG may determine the current position information about the UE in accordance with the local IP address of the UE, and issue the emergency number list corresponding to the current position information to the UE. In this way, even when the UE is roaming, the UE may still acquire the emergency number list at a roaming destination after it has accessed to the wireless local area network at the roaming destination, so it is able to dynamically acquire the emergency number list. In addition, when an emergency calling service is executed by the UE through VoWiFi, the UE may identify a called number inputted by the user as an emergency number at the roaming destination in accordance with the acquired emergency number list at the roaming destination, so it is able to execute the emergency calling process rapidly.

Fifth Embodiment

On the basis of the above embodiments, the present disclosure further provides in this embodiment another process of configuring, by the network side device, the emergency number list at the roaming destination for the UE.

After the UE has accessed to the wireless local area network at the roaming destination, the UE may initiate the IKA SA negotiation with the ePDG, i.e., transmit the IKE_INIT_Request message to the ePDG, and the position information about the UE may be carried in the IKE_INIT_Request message. Here, the emergency number lists corresponding to different geographical positions may be pre-configured in the ePDG. Apart from the position information about the UE, negotiation information (e.g., an SA proposal) may also be carried in the IKE_INIT_Request message.

The position information about the UE may be position information determined by the UE itself. The UE may determine the current position information by itself in accordance with a cellular network corresponding to the wireless local area network to which the UE has currently accessed, or information about a current IP address of the UE, or through a GPS configured in the UE.

Upon the receipt of the IKE_INIT_Request message, the ePDG may determine the position information carried in the IKE_INIT_Request message as the current position information about the UE, determine an IKA SA-related encryption algorithm in accordance with the negotiation information carried in the IKE_INIT_Request message, and transmission a connection response (IKE_INIT_Response) message to the UE. Here, the IKE_INIT_Response message may be adopted to notify the UE that a communication channel has been established successfully, and this communication channel may be an IKEv2 channel.

The UE may transmit an IKE_AUTH_Request message to the ePDG through the established communication channel, and information for requesting the emergency number list may be carried in the IKE_AUTH_Request message. Here, identity information about the UE may be further carried in the IKE_AUTH_Request message.

In addition, information about a local IP address of the UE may be carried in the IKE_AUTH_Request message. Upon the receipt of the IKE_AUTH_Request message, the ePDG may determine the current position information about the UE in accordance with the information about the local IP address of the UE carried in the IKE_AUTH_Request message. Alternatively, the position information about the UE may be carried in the IKE_AUTH_Request message. Upon the receipt of the IKE_AUTH_Request message, the ePDG may determine the position information carried in the IKE_AUTH_Request message as the current position information about the UE.

Upon the receipt of the IKE_AUTH_Request message, the ePDG may transmit a validation request message to the AAA server, so that the AAA server performs identity authentication on the UE. Here, a process of performing, by the AAA server, the identity authentication on the UE is a standard process known in the art, and thus will not be particularly defined herein.

After the identity authentication has been performed successfully, i.e., upon the receipt of a validation response message from the AAA server, the ePDG may transmit a session establishment request message to the PGW, so as to establish a connection relationship between the UE and the PGN. Here, a process of requesting, by the ePDG, the PGW to establish a session for the UE is a standard process known in the art, and thus will not be particularly defined herein.

Upon the receipt of a session establishment response message from the PGW, the ePDG may transmit an IKE_AUTH_Response message to the UE through the established communication channel. The emergency number list corresponding to the current position information about the UE may be carried in the IKE_AUTH_Response message.

According to the fifth embodiment of the present disclosure, the network side device may determine the position information about the UE in accordance with the information about the UE carried in the connection establishment message from the UE, and issue the emergency number list corresponding to the position information to the UE. In addition, the information about the UE may be the position information about the UE, and at this time, the network side device may directly take the position information about the current position information about the UE. As a result, it is able for the network side device to determine the position information about the UE efficiently, and reduce the number of computational resources, thereby to enable the UE to execute an emergency calling process rapidly.

Sixth Embodiment

In this embodiment, after a UE has accessed to a wireless local area network, the UE may receive an emergency number list corresponding to position information about the UE from a network side device.

A method for acquiring an emergency number in this embodiment may be applied to the UE, and the UE may be a device capable of accessing to the wireless local area network and receiving the emergency number list from the network side device, e.g., a mobile phone, a flat-panel computer or a Personal Digital Assistant (PDA).

After the UE has accessed to the wireless local area network, the UE may receive the emergency number list corresponding to the position information about the UE from the network side device, and execute an emergency calling service in accordance with the received emergency number list.

To be specific, after the UE has accessed to the wireless local area network each time, the network side device may determine the position information about the UE, and issue the emergency number list corresponding to the position information about the UE to the UE. Of course, after the UE has accessed to the wireless local area network, when the network side device determines that the position information about the UE changes, the network side device may issue the emergency number list corresponding to the current position information about the UE to the UE. A distance threshold may be stored in the network side device. When a distance between a position where the UE was previously located and a position where the UE is currently located is greater than the distance threshold, the network side device may issue the emergency number list corresponding to the current position information about the UE to the UE.

Seventh Embodiment

Figure 4:
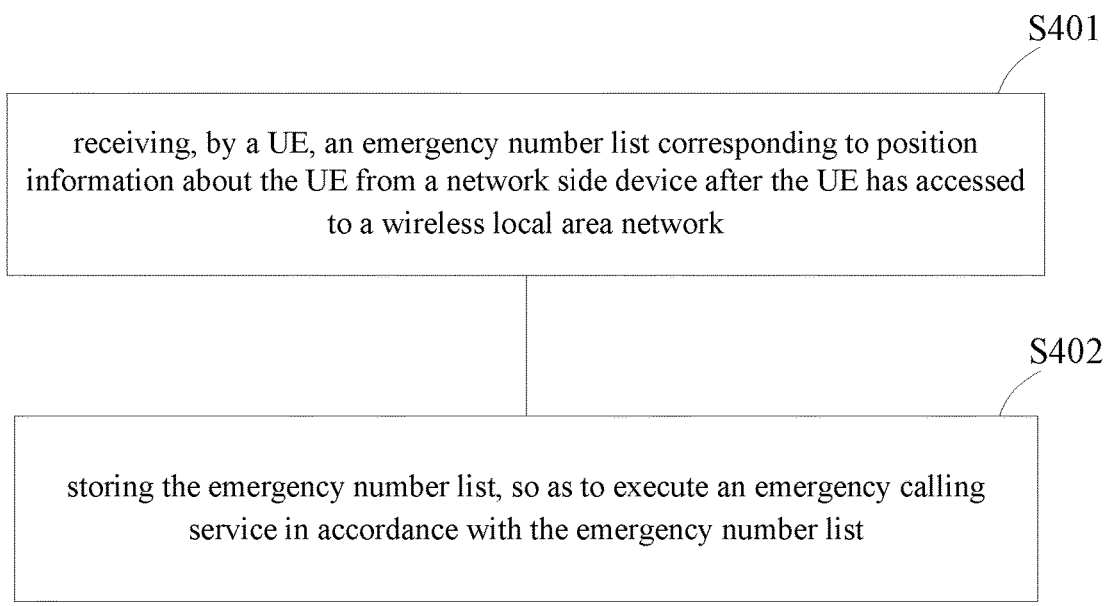
FIG. 4 is a flow chart of a method for acquiring an emergency number according to a seventh embodiment of the present disclosure.

Usually, one country is provided with a unique emergency number list, and different countries are provided with different emergency number lists. In addition, a user does not go abroad frequently, i.e., the position information about the UE may not greatly change frequently. Hence, it is unnecessary for the UE to acquire the emergency number list corresponding to the position information above the UE wen the UE accesses to the wireless local area network each time. For convenience, on the basis of the above-mentioned embodiment, the present disclosure further provides in this embodiment a method for acquiring an emergency number which, as shown in FIG. 4, includes the following steps.

S401: receiving, by the UE, an emergency number list corresponding to the position information about the UE from a network side device after the UE has accessed to the wireless local area network.

Here, the network side device may be any network side device in a core network capable of achieving the above-mentioned function, e.g., an ePDG. Emergency number lists corresponding to different geographical positions may be pre-configured in the network side device.

During the implementation, after the UE has accessed to the wireless local area network and before the UE has received the emergency number list issued by the network side device in accordance with the position information about the UE, the UE may transmit a connection request message to the network side device, so that the network side device may determine the position information about the UE in accordance with information about an IP address of the UE or the position information carried in the connection request message.

Further, after the UE has transmitted the connection request message to the network side device and before the UE has received the emergency number list issued by the network side vice in accordance with the position information about the UE, the UE may further receive a connection response message from the network side device. The connection response message may be adopted to notify the UE that a communication channel has been established successfully.

During the implementation, the receiving, by the UE, the emergency number list issued by the network side device in accordance with the position information about the UE may include transmitting, by the UE, an authentication request message carrying emergency number list request information to the network side device through the established communication channel, and receiving an authentication response message carrying a configured emergency number list from the network side device through the communication channel.

Further, information about an IP address of the UE may also be carried in the authentication request message, and the network side device may determine the position information about the UE in accordance with the information about the IP address of the UE carried in the authentication request message.

Alternatively, the position information about the UE may also be carried in the authentication request message, and the network side device may determine the current position information about the UE in accordance with the position information about the UE carried in the authentication request message.

The position information about the UE carried in the connection request message and the authentication request message may be position information determined by the UE itself. The UE may determine the current position information by itself in accordance with a cellular network corresponding to the wireless local area network to which the UE has currently accessed, or the information about the IP address of the UE, or through a GPS configured in the UE.

S402: storing the emergency number list, so as to execute an emergency calling service in accordance with the emergency number list.

During the implementation, after the UE has acquired the emergency number list corresponding to the position information as mentioned above, the UE may store the emergency number list. When a user inputs a called number, the UE may determine the currently-inputted called number as the emergency number corresponding to the position information in accordance with the stored emergency number list, and thereby execute an emergency calling process rapidly.

According to the seventh embodiment of the present disclosure, after the UE has accessed to the wireless local area network, the UE may receive the emergency number list issued by the network side device in accordance with the position information about the UE, and store the emergency number list. In this way, even when the UE is roaming, the UE may still acquire the emergency number list at a roaming destination after it has accessed to the wireless local area network at the roaming destination, so it is able to dynamically acquire the emergency number list. In addition, when an emergency calling service is executed by the UE through VoWiFi, the UE may identify a called number inputted by the user as an emergency number at the roaming destination in accordance with the acquired emergency number list at the roaming destination, so it is able to execute the emergency calling process rapidly.

Based on a same inventive concept, the present disclosure further provides in some embodiments a device for configuring an emergency number corresponding to the above-mentioned method for configuring the emergency number. A principle of the device is similar to that of the method, so the implementation of the device may refer to that of the method, and thus will not be particularly defined herein.

Eighth Embodiment

Figure 5:
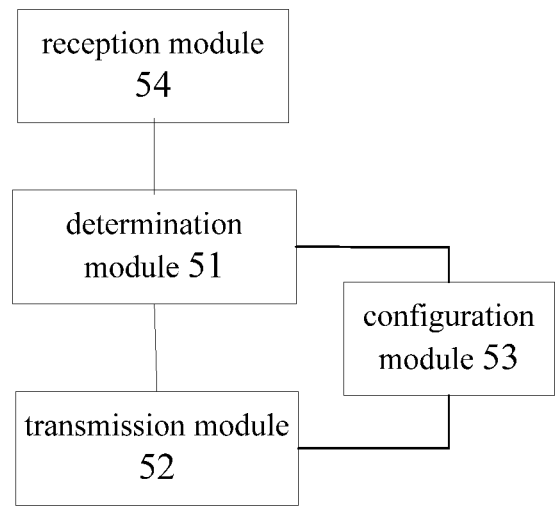
FIG. 5 is a schematic view showing a device for configuring an emergency number according to an eighth embodiment of the present disclosure.

As shown in FIG. 5, the present disclosure provides in this embodiment a device for configuring an emergency number which includes: a determination module 51 configured to determine position information about a UE when the UE has accessed to a wireless local area network; and a transmission module 52 configured to issue an emergency number list corresponding to the position information about the UE to the UE.

In some possible embodiments of the present disclosure, the device may further include a configuration module 53 configured to configure the emergency number list for the UE in accordance with the determined position information about the UE and pre-configured emergency number lists corresponding to different geographical position information. The transmission module 52 is further configured to issue the emergency number list configured for the UE to the UE.

In some possible embodiments of the present disclosure, the device may further include a reception module 54 configured to receive a connection establishment message from the UE. The determination module 51 is further configured to, after the reception module has received the connection request message from the UE, determine the position information about the UE in accordance with information about the UE carried in the connection establishment message.

In some possible embodiments of the present disclosure, the reception module 54 is further configured to receive a connection request message or an authentication request message from the UE. The determination module 51 is further configured to, after the reception module has received the connection request message or the authentication request message from the UE, determine the position information about the UE in accordance with the information about the UE carried in the connection request message or the authentication request message.

In some possible embodiments of the present disclosure, the determination module 51 is further configured to, after the reception module has received the connection request message or the authentication request message from the UE, determine the position information about the UE in accordance with information about an IP address of the UE or the position information about the UE carried in the connection request message or the authentication request message.

In some possible embodiments of the present disclosure, the transmission module 52 is further configured to, after the reception module has received the connection request message from the UE and before the transmission module has issued the emergency number list configured for the UE to the UE, transmit a connection response message to the UE so as to notify the UE that a communication channel has been established successfully.

In some possible embodiments of the present disclosure, the reception module 54 is further configured to receive the authentication request message carrying emergency number list request information from the UE through the communication channel. The transmission module 52 is further configured to transmit an authentication response message carrying the configured emergency number list to the UE through the communication channel.

In some possible embodiments of the present disclosure, the transmission module 52 is further configured to: after the reception module has received the authentication request message and before the transmission module has transmitted the authentication response message to the UE, transmit a validation request message to an authentication server so that the authentication server performs identity authentication on the UE; after the identity authentication has been performed successfully, transmit a session establishment request message to a PGW; and after the reception module has received a session establishment response message from the PGW, transmit the authentication response message to the UE through the communication channel.

According to the device in the eighth embodiment of the present disclosure, the emergency number lists corresponding to different geographical positions may be pre-configured in the determination module. After the UE has accessed to the wireless local area network, the network side device may determine the position information about the UE, and issue the emergency number list corresponding to the position information to the UE. As a result, even when the UE is roaming, the UE may still acquire the emergency number list at a roaming destination after it has accessed to the wireless local area network at the roaming destination, so it is able for the UE to dynamically acquire the emergency number list. When an emergency call service is executed by a user through VoWiFi, the UE may identify a called number inputted by the user as the emergency number at the roaming destination in accordance with the acquired emergency number list at the roaming destination, so it is able for the UE to execute an emergency calling process rapidly.

Based on a same inventive concept, the present disclosure further provides in some embodiments a device for acquiring an emergency number corresponding to the above-mentioned method for acquiring the emergency number. A principle of the device is similar to that of the method, so the implementation of the device may refer to that of the method, and thus will not be particularly defined herein.

Ninth Embodiment

Figure 6:
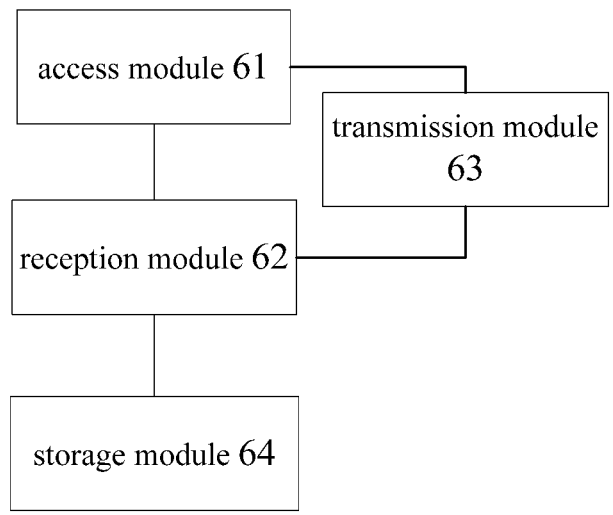
FIG. 6 is a schematic view showing a device for acquiring an emergency number according to a ninth embodiment of the present disclosure.

As shown in FIG. 6, the present disclosure further provides in this embodiment a device for acquiring an emergency number which includes: an access module 61 configured to enable a UE to access to a wireless local area network; and a reception module 62 configured to receive an emergency number list corresponding to position information about the UE from a network side device after the UE has accessed to a wireless local area network.

In some possible embodiments of the present disclosure, the device may further include a transmission module 63 configured to transmit an authentication request message carrying emergency number list request information to the network side device through a communication channel established between the UE and the network side device. The reception module 62 is further configured to receive an authentication response message carrying a configured emergency number list from the network side device through the communication channel.

In some possible embodiments of the present disclosure, the device may further include a storage module 64 configured to store the emergency number list, so as to enable the UE to execute an emergency call service in accordance with the emergency number list.

According to the device in the ninth embodiment of the present disclosure, after the UE has accessed to the wireless local area network, the reception module may receive the emergency number list corresponding to the position information about the UE from the network side device, and the emergency number list may be stored in the storage module. As a result, even when the UE is roaming, the UE may still acquire the emergency number list at a roaming destination after it has accessed to the wireless local area network at the roaming destination, so it is able for the UE to dynamically acquire the emergency number list. When an emergency call service is executed by a user through VoWiFi, the UE may identify a called number inputted by the user as the emergency number at the roaming destination in accordance with the acquired emergency number list at the roaming destination, so it is able for the UE to execute an emergency calling process rapidly.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for configuring an emergency number, comprising:
   determining, by a network side device, position information about a User Equipment (UE) when the UE has accessed to a wireless local area network;
   issuing, by the network side device, an emergency number list corresponding to the position information about the UE to the UE; and
   wherein the issuing, by the network side device, the emergency number list configured for the UE to the UE comprises: upon receipt of an authentication request message carrying emergency number list request information transmitted through a communication channel, transmitting, by the network side device, an authentication response message carrying the configured emergency number list to the UE through the communication channel.

2. The method according to claim 1, further comprising:
   configuring the emergency number list for the UE in accordance with the determined position information about the UE and pre-configured emergency number lists corresponding to different geographical position information, wherein the issuing, by the network side device, the emergency number list corresponding to the position information about the UE to the UE comprises: issuing, by the network side device, the emergency number list configured for the UE to the UE.

3. The method according to claim 2, wherein the determining, by the network side device, the position information about the UE comprises: receiving, by the network side device, a connection establishment message from the UE; and determining the position information about the UE in accordance with information about the UE carried in the connection establishment message.

4. The method according to claim 3, wherein the connection establishment message is a connection request message or the authentication request message.

5. The method according to claim 4, wherein the information about the UE comprises information about an Internet Protocol (IP) address of the UE or the position information about the UE.

6. The method according to claim 4, wherein subsequent to receiving, by the network side device, the connection request message from the UE and prior to issuing, by the network side device, the emergency number list configured for the UE to the UE, the method further comprises: transmitting, by the network side device, a connection response message to the UE so as to notify the UE that the communication channel has been established successfully.

7. The method according to claim 1, wherein subsequent to receiving, by the network side device, the authentication request message and prior to transmitting, by the network side device, the authentication response message to the UE, the method further comprises:
    transmitting a validation request message to an authentication server so that the authentication server performs identity authentication on the UE; and
    after the identity authentication has been performed successfully, transmitting a session establishment request message to a Packet Data Network (PDN) Gateway (PGW),
    wherein the transmitting, by the network side device, the authentication response message to the UE comprises: upon the receipt of the session establishment response message from the PGW, transmitting, by the network side device, the authentication response message to the UE through the communication channel.

8. The method according to claim 1, wherein the network side device is an evolved Packet Data Gateway (ePDG).

9. A computer-readable storage medium storing therein a computer program, wherein the computer program is executed by a processor so as to implement the method for configuring the emergency number according to claim 1.

10. A method for acquiring an emergency number, comprising:
    receiving, by a User Equipment (UE), an emergency number list corresponding to position information about the UE from a network side device after the UE has accessed to a wireless local area network;
    wherein the receiving, by the UE, the emergency number list corresponding to the position information about the UE from the network side device comprises:
        transmitting, by the UE, an authentication request message carrying emergency number list request information to the network side device through a communication channel established between the UE and the network side device; and
        receiving, by the UE, an authentication response message carrying a configured emergency number list from the network side device through the communication channel.

11. The method according to claim 10, further comprising:
    storing the emergency number list, so as to enable the UE to execute an emergency call service in accordance with the emergency number list.

12. A device for acquiring an emergency number, comprising a processor, a memory, and a computer program stored in the memory and executed by the processor, The computer program is executed by the processor so as to implement the method for acquire the emergency number according to claim 10.

13. A computer-readable storage medium storing therein a computer program, wherein the computer program is executed by a processor so as to implement the method for acquiring the emergency number according to claim 10.

14. A device for configuring an emergency number, comprising a processor, a memory, and a computer program stored in the memory and executed by the processor, wherein the computer program is executed by the processor so as to implement a method for configuring the emergency number, comprising:
    determining position information about a User Equipment (UE) when the UE has accessed to a wireless local area network;
    issuing an emergency number list corresponding to the position information about the UE to the UE; and
    wherein the issuing, by the network side device, the emergency number list configured for the UE to the UE comprises: upon receipt of an authentication request message carrying emergency number list request information transmitted by through a communication channel, transmitting, by the network side device, an authentication response message carrying the configured emergency number list to the UE through the communication channel.

15. The device for configuring an emergency number according to claim 14, further comprising:
    configuring the emergency number list for the UE in accordance with the determined position information about the UE and pre-configured emergency number lists corresponding to different geographical position information, wherein the issuing, by the network side device, the emergency number list corresponding to the position information about the UE to the UE comprises: issuing, by the network side device, the emergency number list configured for the UE to the UE.

16. The device for configuring an emergency number according to claim 15, wherein the determining, by the network side device, the position information about the UE comprises: receiving, by the network side device, a connection establishment message from the UE; and determining the position information about the UE in accordance with information about the UE carried in the connection establishment message.

17. The device for configuring an emergency number according to claim 16, wherein the connection establishment message is a connection request message or the authentication request message.

18. The device for configuring an emergency number according to claim 17, wherein the information about the UE comprises information about an Internet Protocol (IP) address of the UE or the position information about the UE; and
    wherein subsequent to receiving, by the network side device, the connection request message from the UE and prior to issuing, by the network side device, the emergency number list configured for the UE to the UE, the method further comprises: transmitting, by the network side device, a connection response message to the UE so as to notify the UE that the communication channel has been established successfully.

* * * * *